(12) United States Patent
Jahnke (10) Patent No.: US 10,436,193 B1
(45) Date of Patent: Oct. 8, 2019

(54) CYLINDER LINER RETAINER SYSTEM WITH TORQUE MULTIPLIER AND METHOD

(71) Applicant: PREMIUM OILFIELD TECHNOLOGIES, LLC, Houston, TX (US)

(72) Inventor: Douglas Jahnke, Houston, TX (US)

(73) Assignee: PREMIUM OILFIELD TECHNOLOGIES, LLC, Houston, TX (US)

(*) Notice: Subject to any disclaimer, the term of this patent is extended or adjusted under 35 U.S.C. 154(b) by 51 days.

(21) Appl. No.: 15/801,424

(22) Filed: Nov. 2, 2017

Related U.S. Application Data

(60) Provisional application No. 62/417,932, filed on Nov. 4, 2016.

(51) Int. Cl.
*F16J 10/04* (2006.01)
*F04B 53/16* (2006.01)
*F04B 53/22* (2006.01)

(52) U.S. Cl.
CPC ............ *F04B 53/168* (2013.01); *F04B 53/22* (2013.01); *F16J 10/04* (2013.01)

(58) Field of Classification Search
CPC ...... F04B 53/166; F04B 53/168; F04B 53/22; F16J 10/04
USPC ......................................... 92/171.1
See application file for complete search history.

(56) References Cited

U.S. PATENT DOCUMENTS

| 2,981,575 | A | * | 4/1961 | Leman | F04B 53/168 |
| | | | | | 92/171.1 |
| 4,477,232 | A | * | 10/1984 | Mayer | F04B 9/1178 |
| | | | | | 417/360 |
| 4,550,646 | A | * | 11/1985 | Miller | F04B 53/166 |
| | | | | | 92/171.1 |
| 6,588,318 | B2 | * | 7/2003 | Aday | F04B 53/168 |
| | | | | | 92/171.1 |
| 10,041,490 | B1 | * | 8/2018 | Jahnke | F04B 53/168 |

* cited by examiner

*Primary Examiner* — Michael Leslie
(74) *Attorney, Agent, or Firm* — Jackson Walker, LLP (57) ABSTRACT

The present invention provides a cylinder liner retainer system with a torque multiplier and associated method to quickly release an existing cylinder liner and reinsert a new cylinder liner as a replacement.

10 Claims, 11 Drawing Sheets

CYLINDER LINER RETAINER SYSTEM WITH TORQUE MULTIPLIER AND METHOD

CROSS REFERENCE TO RELATED APPLICATIONS

This application claims the benefit of U.S. Provisional Application No. 62/417,932, filed Nov. 4, 2016, which is incorporated by reference herein.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The disclosure relates generally to equipment used with liner and retainers in cylindrical cavities. More specifically, the disclosure relates to a cylindrical liner retainer, such as for pumps.

Description of the Related Art

The efficiency of maintenance on equipment such as oilfield equipment can have a dramatic impact on profitability. A faster repair and restart of operation can be valuable. One area of need is to change quickly a cylindrical liner retainer assembly in equipment that repeatedly wears out such liners.

Figure 1:
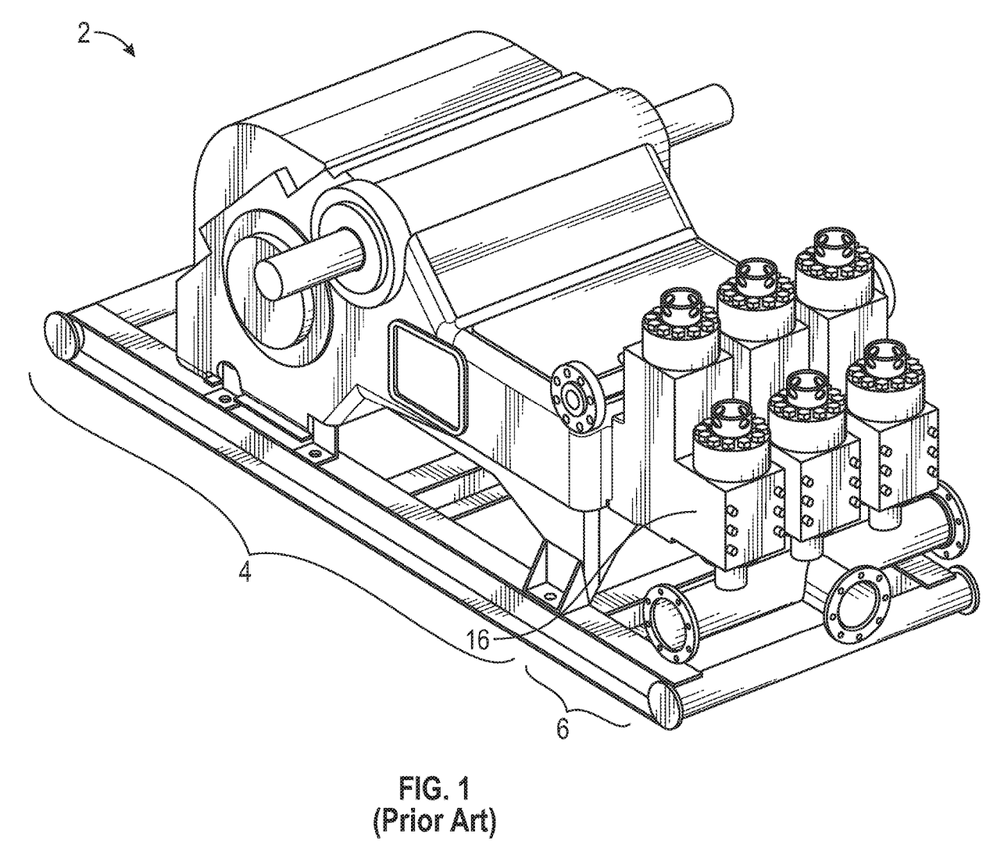
FIG. 1 is a schematic perspective view of an exemplary known pump assembly having power end and fluid end.
Figure 2:
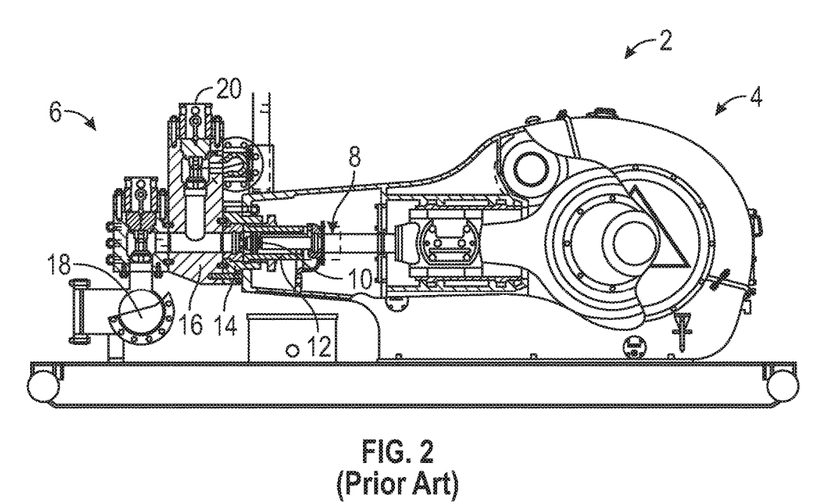
FIG. 2 is a schematic cross sectional view of the known pump assembly of FIG. 1.
Figure 3:
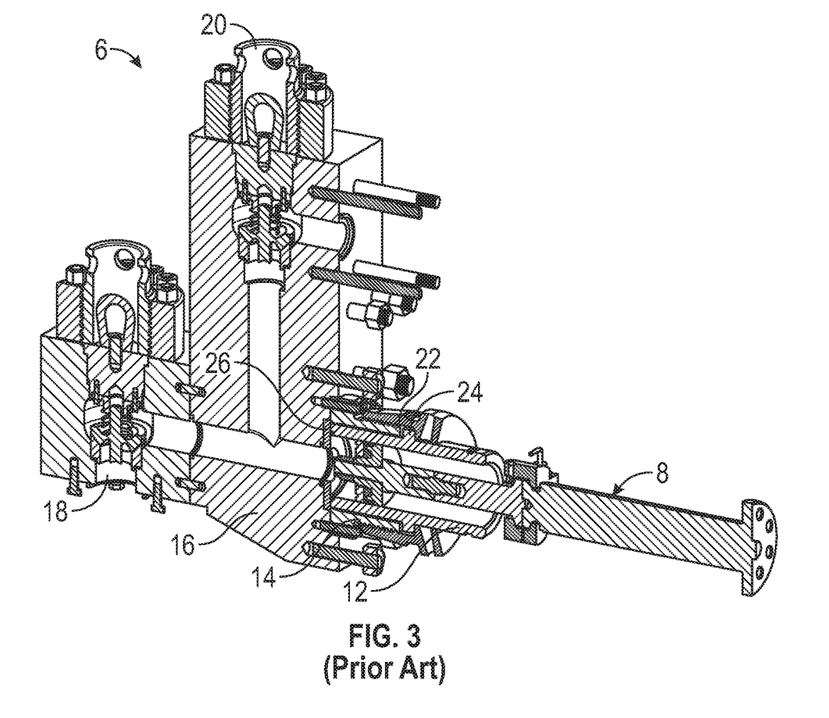
FIG. 3 is a schematic cross sectional perspective view of the known fluid end of FIG. 2 with a replaceable cylinder liner and associated components to retain in position.
Figure 4:
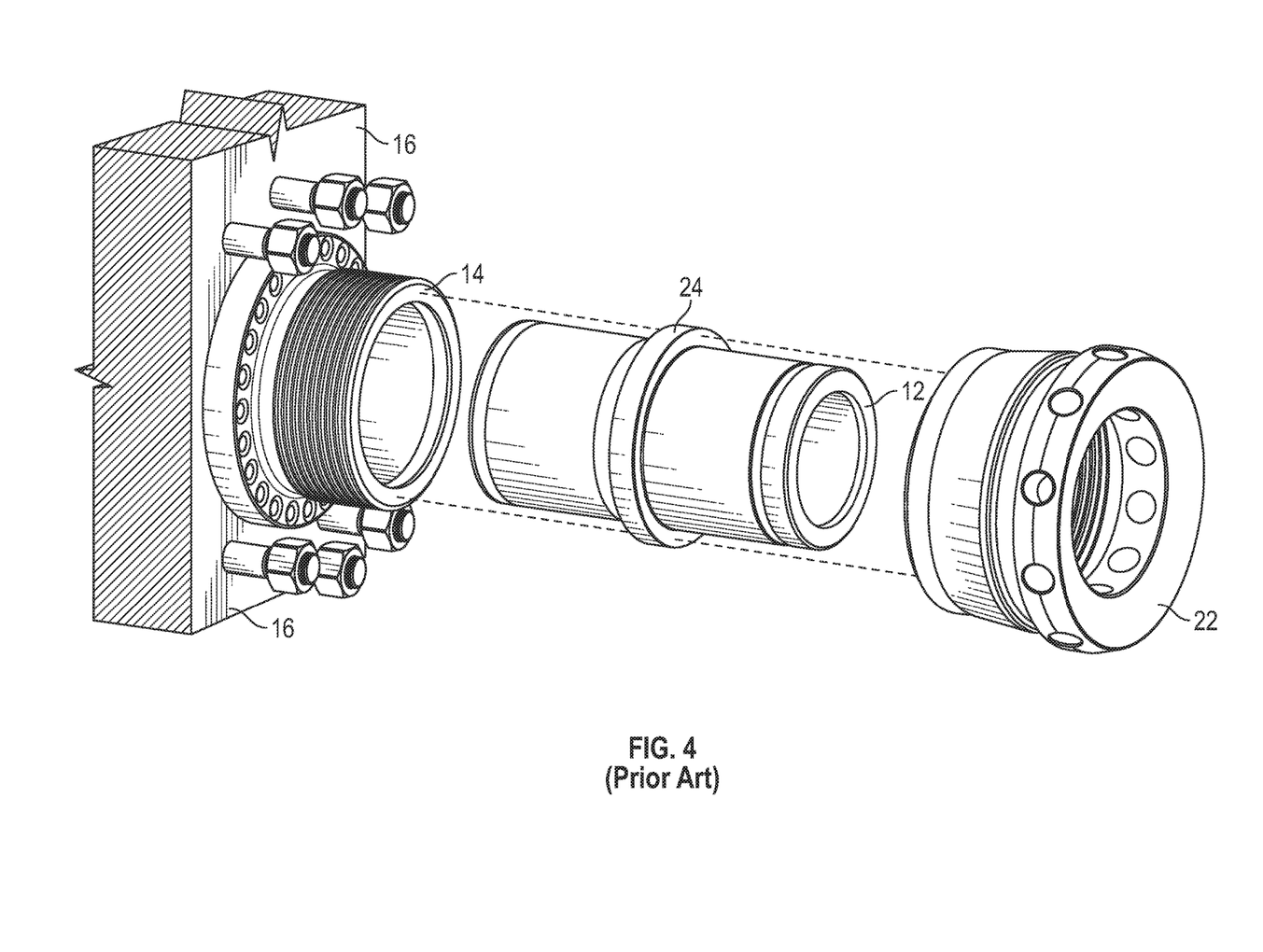
FIG. 4 is a schematic assembly view of the cylinder liner with the liner bushing and liner nut shown in FIG. 3.

FIG. 1 is a schematic perspective view of an exemplary known pump assembly having power end and fluid end. FIG. 2 is a schematic cross sectional view of the known pump assembly of FIG. 1. FIG. 3 is a schematic cross sectional perspective view of the known fluid end of FIG. 2 with a replaceable cylinder liner and associated components to retain in position. FIG. 4 is a schematic assembly view of the cylinder liner with the liner bushing and liner nut shown in FIG. 3. The pump assembly 2 generally includes a power end 4 coupled with a fluid end 6. The power end 4 can include an engine, motor, or other prime mover. The fluid end can include inlets, outlets, valves, and flow paths. A piston rod assembly 8 couples the power end 4 with the fluid end 6 and reciprocates within a cylinder liner 12 held in position by a liner bushing 14 and coupled to a fluid end portion 16 with a liner nut 22. The piston reciprocation within the cylinder liner alternatively pulls fluid into the pump end 6 from an inlet 18 and then pushes the fluid through the pump end out of the outlet 20.

The life of a typical chrome iron liner in an oil field pump can be 1000 hours or less. To install a replacement cylinder liner at normal operating pressures and size of an oil field pump, a service person usually needs to exert 4000 foot-pounds of torque on the liner nut 22. This large amount of torque is equivalent to a 150 pound service person hanging with the person's full weight onto a 27 foot long pipe attached to the liner nut to create the torque. Typically, rods or pipes and large hammers are used to turn the liner nut 22 to the required torque, inviting accidents and injuries. The reverse procedure can be applied to remove the liner nut. After the liner nut is removed, the cylinder liner is removed often with an adaptor to connect to the piston positioned within the cylinder liner and an external groove on the cylinder liner. Then, the piston is retracted away from the fluid end toward the power end to remove the liner with the piston. After replacement of the cylinder liner, the liner nut again needs to be torqued to 4000 foot-pounds in such applications. Other applications may vary in the torque requirements.

There remains a need for an improved cylinder liner assembly that can be used to install and remove the cylinder liner. The present invention offers such a solution.

BRIEF SUMMARY OF THE INVENTION

The present invention provides a cylinder liner retainer system with a torque multiplier and associated method to quickly release an existing cylinder liner and reinsert a new cylinder liner as a replacement.

The disclosure provides a cylinder liner retainer system to couple a replaceable cylinder liner to a fluid end portion of a pump, the pump having a piston to reciprocate longitudinally along a centerline within the cylinder liner, comprising: a liner housing formed with threads and a longitudinal bore formed inside a housing wall and configured to be slidably coupled with the liner, the liner housing having a portion configured to be coupled to the fluid end portion; a pinion bracket assembly having a pinion rotatably coupled thereto, the pinion having gear teeth and a rotatable actuator; and a collar nut having a longitudinal bore sized to be slidably coupled with the liner on a distal end of the liner from the liner housing, the collar nut formed with threads configured to be threadably coupled with the threads on the liner housing, and the collar nut having a gear with teeth configured to be rotatably coupled with the gear teeth on the pinion; wherein the collar nut is configured to be threadably coupled with the liner housing and secure the liner therebetween by rotation of the pinion that rotates the collar nut gear with the collar nut that couples the threads on the liner housing with the threads on the collar nut that presses the liner toward the fluid end portion.

The disclosure also provides a method of installing a replaceable cylinder liner for a piston in a pump, the piston configured to reciprocate longitudinally along a centerline within the cylinder liner, the pump having a cylinder liner retainer system to couple the cylinder liner to a fluid end portion of the pump, the cylinder liner retainer system having a liner housing formed with threads and a longitudinal bore formed inside a housing wall, the liner housing having a portion configured to be coupled to the fluid end portion, a pinion bracket assembly having a pinion rotatably coupled thereto, the pinion having gear teeth and a rotatable actuator, and a collar nut having a longitudinal bore and formed with threads and having a collar nut gear with teeth, the method comprising: slidably coupling the cylinder liner into the bore of the liner housing; slidably coupling the collar nut with the cylinder liner, the collar nut bore being disposed over the cylinder liner at a distal end of the liner from the liner housing; rotating the collar nut to couple the threads on the collar nut with the threads on the liner housing; rotatably coupling the collar nut gear teeth with the pinion gear teeth; and rotating the actuator on the pinion to rotate the collar nut gear thereby further coupling the threads on the collar nut with the threads on the liner housing and pressing the liner toward the fluid end portion with the collar nut.

DETAILED DESCRIPTION

The Figures described above and the written description of specific structures and functions below are not presented to limit the scope of what Applicant has invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present disclosure will require numerous implementation-specific decisions to achieve the developer's ultimate goal for the commercial embodiment. Such implementation-specific decisions may include, and likely are not limited to, compliance with system-related, business-related, government-related, and other constraints, which may vary by specific implementation, location, and from time to time. While a developer's efforts might be complex and time-consuming in an absolute sense, such efforts would be, nevertheless, a routine undertaking for those of ordinary skill in this art having benefit of this disclosure. It must be understood that the inventions disclosed and taught herein are susceptible to numerous and various modifications and alternative forms. The use of a singular term, such as, but not limited to, "a," is not intended as limiting of the number of items. Further, the various methods and embodiments of the system can be included in combination with each other to produce variations of the disclosed methods and embodiments. Discussion of singular elements can include plural elements and vice-versa. References to at least one item may include one or more items. Also, various aspects of the embodiments could be used in conjunction with each other to accomplish the understood goals of the disclosure. Unless the context requires otherwise, the term "comprise" or variations such as "comprises" or "comprising," should be understood to imply the inclusion of at least the stated element or step or group of elements or steps or equivalents thereof, and not the exclusion of a greater numerical quantity or any other element or step or group of elements or steps or equivalents thereof. The device or system may be used in a number of directions and orientations. The term "inner," "inward," "internal" or like terms refers to a direction facing toward the longitudinal centerline of an assembly, such as the cylinder liner retainer system, or component having a longitudinal centerline and the term "outer," "outward," "external" or like terms refers to a direction facing away from the longitudinal centerline. The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The present invention provides a cylinder liner retainer system with a torque multiplier and associated method to quickly release an existing cylinder liner and reinsert a new cylinder liner as a replacement.

Figure 5:
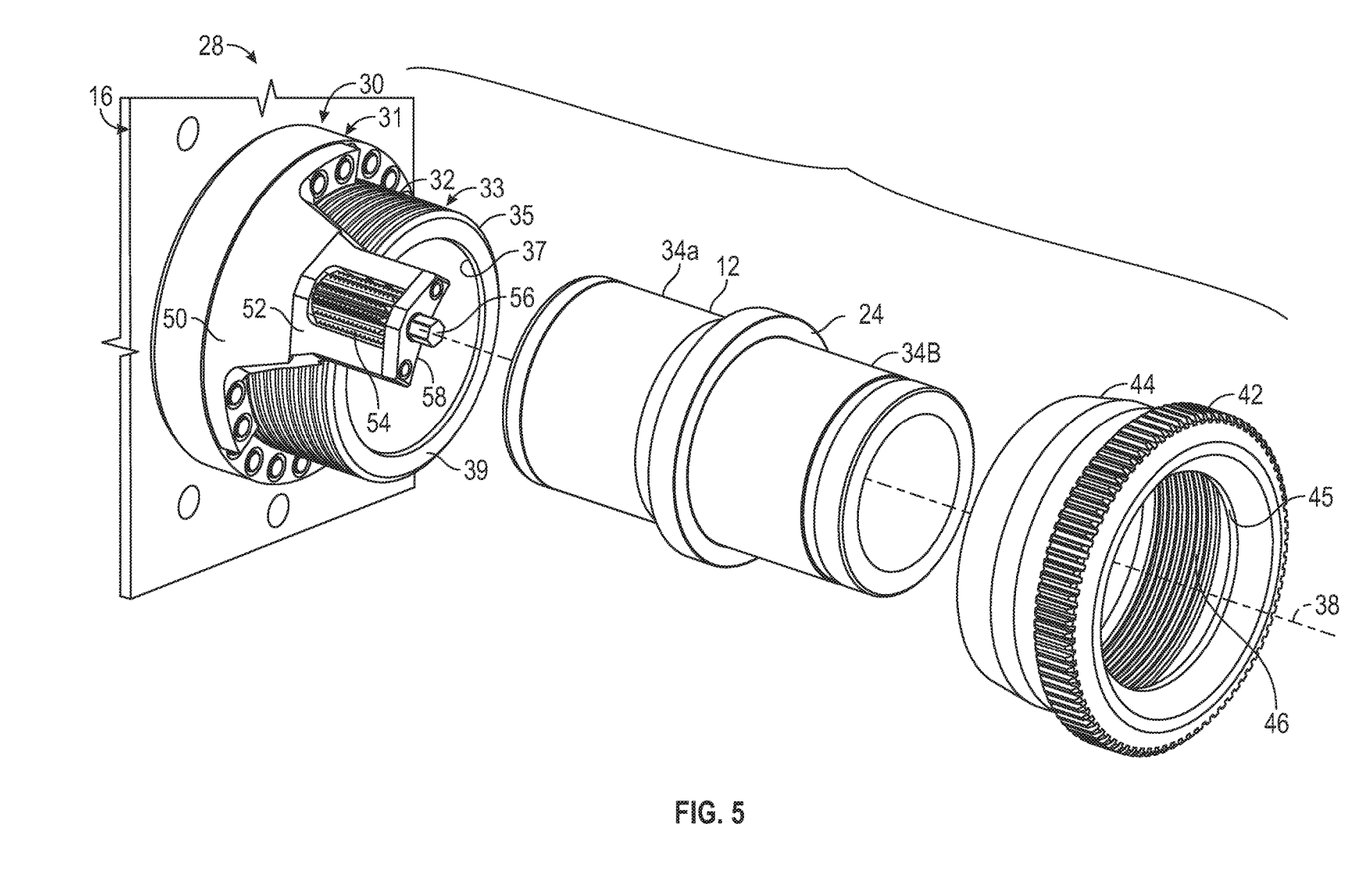
FIG. 5 is a schematic perspective assembly view of an embodiment of a cylinder liner retainer system according to the present invention.

FIG. 5 is a schematic perspective assembly view of cylinder liner retainer system according to the present invention. The cylinder liner retainer system 28 is configured to attach to the fluid end portion 16 of the fluid end 6 described in the above FIGS. 1-4 and hold the cylinder liner 12 in position for the piston rod assembly 8 (shown in FIG. 3) to longitudinally reciprocate therein along a longitudinal axis 38. The cylinder liner retainer system 28 provides an improvement over the prior art liner bushing 14 and liner nut 22 described in FIGS. 1-4.

In at least one embodiment, the cylinder liner retainer system 28 includes a liner housing 30, a collar nut 44, and a pinion housing 52 for the liner 12. The liner housing 30 is configured with a first portion 31, for example with a series of openings, to couple the liner housing to the fluid end portion 16. The liner housing 30 also can include a second portion 33 generally having a smaller diameter than the first portion with an outer periphery 35 and a liner housing bore 37 forming a housing wall 39 therebetween. One or more helically twisting threads 32 can be formed on the outer periphery 35. The term "threads" is used broadly to refer to a thread that helically circumscribes a surface or a series of separate threads that circumscribe a surface.

A pinion bracket assembly 50 can be coupled to the liner housing 30. The pinion bracket assembly can include a pinion housing 52. The pinion housing 52 can be used to rotatably couple a pinion 54 thereto. The pinion 54 can include an actuator 56 extending through a pinion support bracket 58 that is mounted to the pinion housing 52. The pinion 54 generally includes longitudinal teeth. The pinion can also include circumferential grooves 57 in the teeth that interrupt the longitudinal profile of the teeth and can assist in clearing debris as the pinion is rotated.

A collar nut 44 can be configured generally by sizing to allow the outer periphery 35 of the liner housing 30 to pass within a bore 45 of the collar nut, so that at least a portion of the collar nut bore is larger than the liner housing outer periphery. An end portion of the collar nut 44 proximal to the liner housing 30 can include one or more helical threads 46 formed with a pitch to be rotatably coupled with the liner housing threads 32. A distal end of the collar nut 44 can include a collar nut gear 42 having teeth formed around the periphery of the collar nut 44. The collar nut gear 42 can be integral with the collar nut 44 or otherwise fixedly coupled and can be hardened to resist wear. The diameter of the gear teeth 44 is sized to be rotatably coupled with corresponding teeth on the pinion 54, when the collar nut 44 is at least partially coupled to the liner housing 30, as described in more detail below.

A liner 12 is formed with a liner outer surface 34A and sized to fit within a diameter of the liner housing bore 37. Similarly, the liner outer surface 34B is sized to fit within the diameter of the collar nut bore 45. The liner 12 further includes a liner shoulder 24 that can be used by a corresponding internal shoulder on the collar nut 44 to press the liner 12 into engagement with the liner housing 30.

Figure 6:
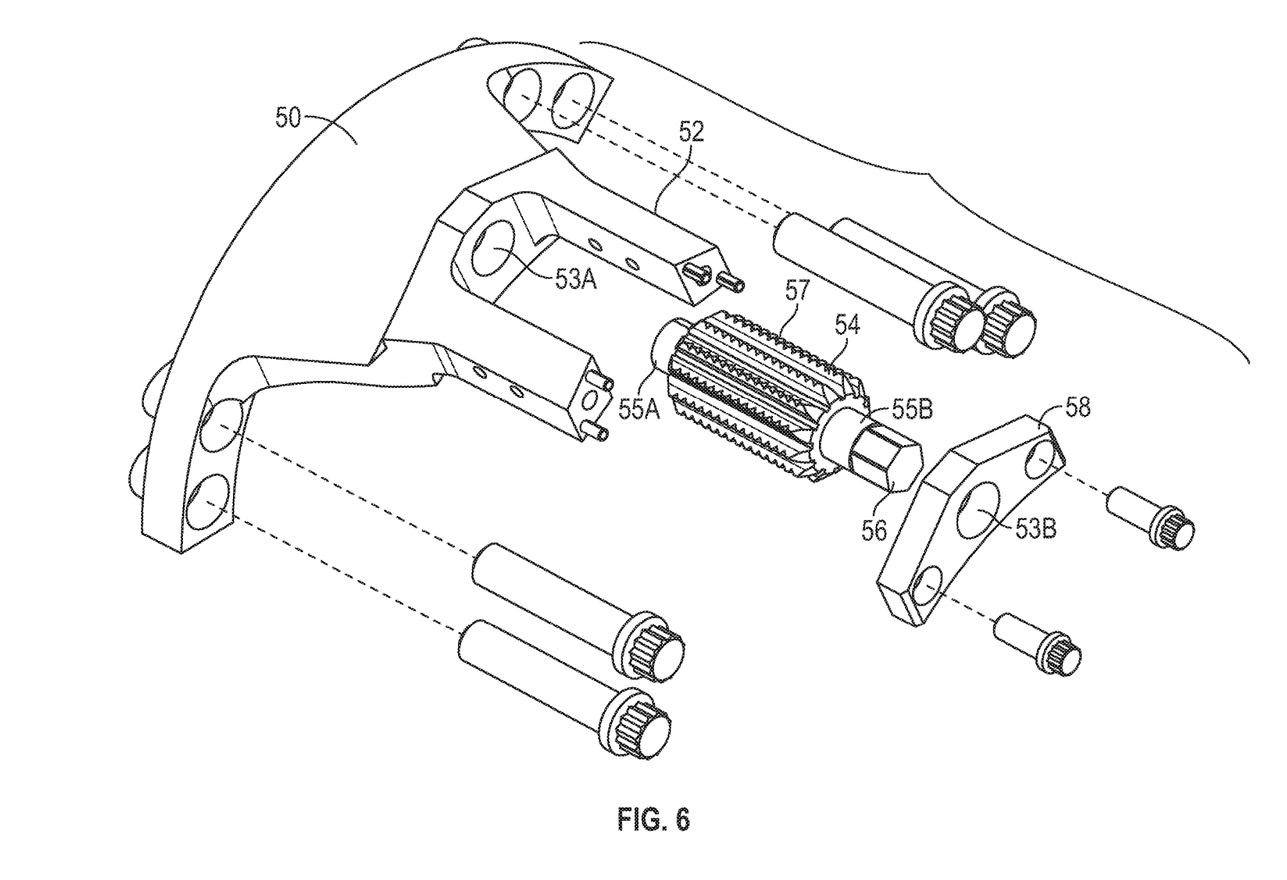
FIG. 6 is a schematic perspective assembly view of pinion bracket assembly according to the present invention.

FIG. 6 is a schematic perspective assembly view of pinion bracket assembly according to the present invention. The pinion bracket assembly 50 includes a portion as a pinion housing 52. The pinion housing 52 has a longitudinal pinion bore 53A to receive an end of a pinion shaft 55A on the pinion 54. A pinion support bracket 58 is configured to be coupled to an end of the pinion housing 52 to support a distal end of the pinion shaft 55B (collectively, "pinion shaft 55"). The pinion shaft 55 further can include an actuator 56 that can protrude through a pinion bore 53B formed in the pinion support bracket 58. The actuator 56 can be accessed to turn the pinion 54 to rotate the collar nut 44, shown in FIG. 5.

Figure 7:
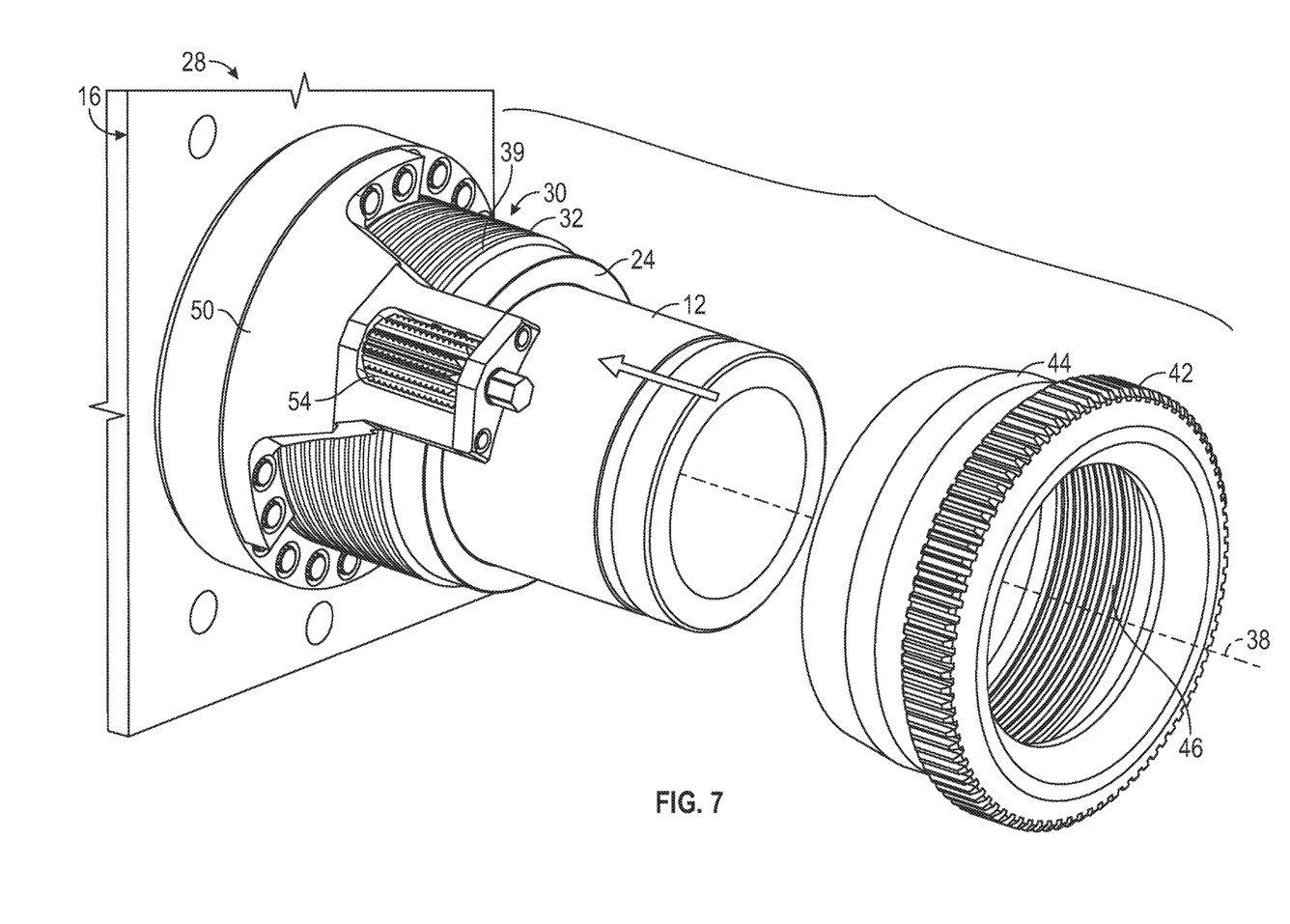
FIG. 7 is a schematic perspective view of a cylinder liner inserted in the liner housing and pinion bracket assembly with a collar nut ready for coupling to the liner housing to secure the liner.

FIGS. 7-10 illustrate an exemplary installation sequence for installing a liner 12 into the cylinder liner retainer system 28. FIG. 7 is a schematic perspective view of a cylinder liner inserted in the liner housing and pinion bracket assembly with a collar nut ready for coupling to the liner housing to secure the liner. With the collar nut 44 disconnected from the liner housing 30, the liner 12 can be slidably coupled, generally by insertion, into the liner housing bore 37, shown in FIG. 5. Preferably, the liner 12 is inserted sufficiently, so that a distal side of the liner shoulder 24 is near or adjacent to the liner housing wall 39.

Figure 8A:
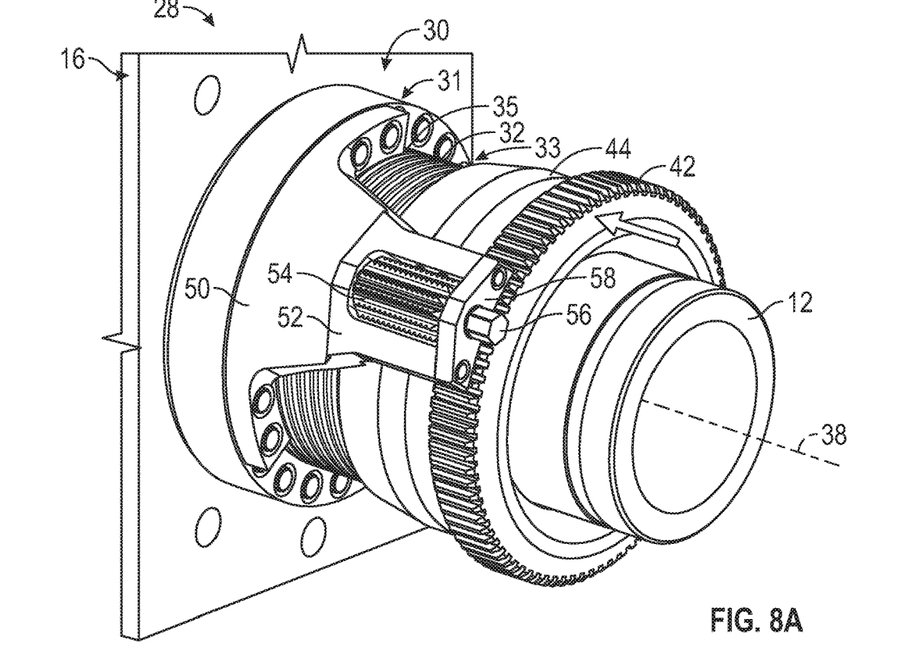
FIG. 8A is a schematic perspective view of the collar nut initially coupled longitudinally with the cylinder liner and rotatably coupled with the pinion bracket assembly.
Figure 8B:
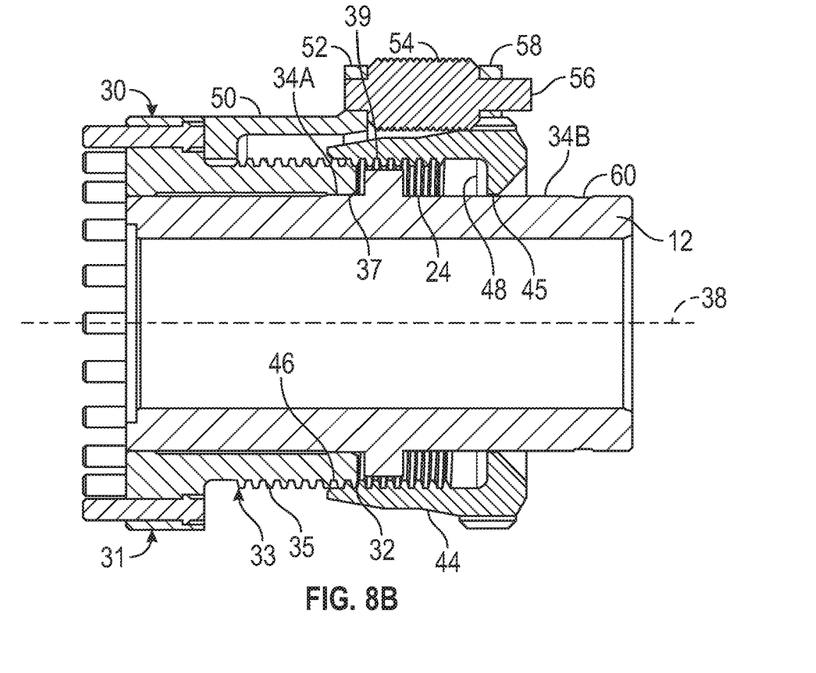
FIG. 8B is a schematic cross sectional view of the collar nut securely coupled longitudinally with the cylinder liner and rotatably coupled with the pinion bracket assembly.

FIG. 8A is a schematic perspective view of the collar nut initially coupled longitudinally with the cylinder liner and rotatably coupled with the pinion bracket assembly. FIG. 8B is a schematic cross sectional view of the collar nut securely coupled longitudinally with the cylinder liner and rotatably coupled with the pinion bracket assembly. The collar nut 44 can be slidably coupled over the liner 12 to couple the liner housing threads 32 with the collar nut threads 46 by rotating the collar nut 44. The collar nut 44 is rotated around the longitudinal axis 38 and sufficient collar nut threads 46 are coupled with liner housing threads 32. The gear 42 becomes located in proximity to the pinion 54 and the teeth of each become rotatably coupled. The pinion 54 is free to rotate with the rotation of the gear 42 in at least one embodiment. Thus, in this position, the liner 12 with an outer surface 34A is slidably coupled within the bore 37 of the liner housing 30 and the distal side of the shoulder 24 is near or adjacent the liner housing wall 39. Similarly, the liner 12 with an outer surface 34B is slidably coupled within the bore 45 of the collar nut 44. The shoulder 48 of the collar nut may not yet be engaged with the shoulder 24 of the liner. The collar nut 44 can be rotated by hand or with a power tool until snug.

Figure 9A:
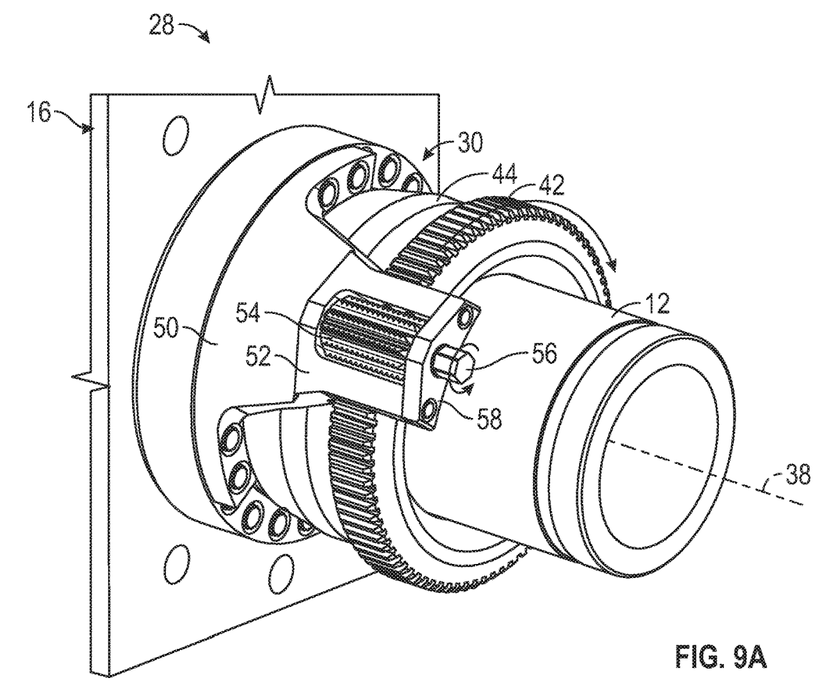
FIG. 9A is a schematic perspective view of the collar nut securely coupled longitudinally with the cylinder liner and rotatably coupled with the pinion bracket assembly.
Figure 9B:
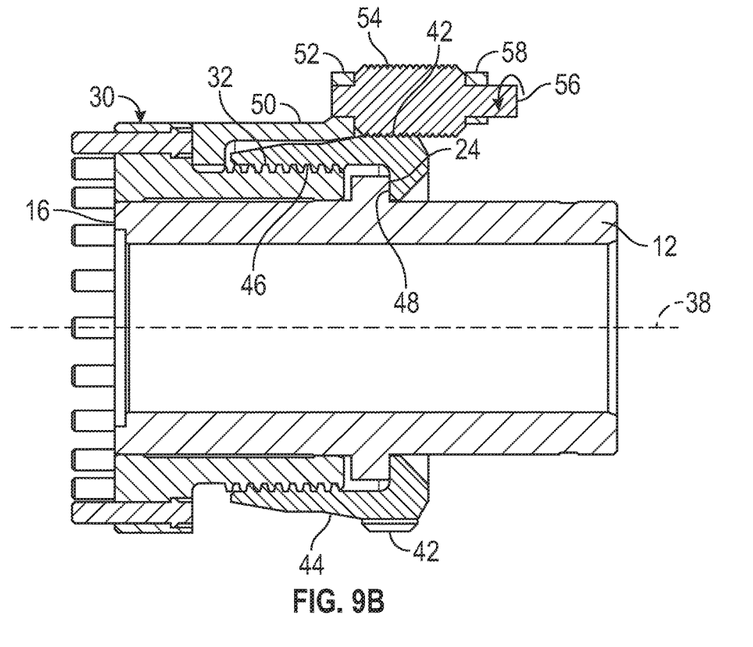
FIG. 9B is a schematic cross sectional view of the collar nut securely coupled longitudinally with the cylinder liner and rotatably coupled with the pinion bracket assembly.
Figure 10:
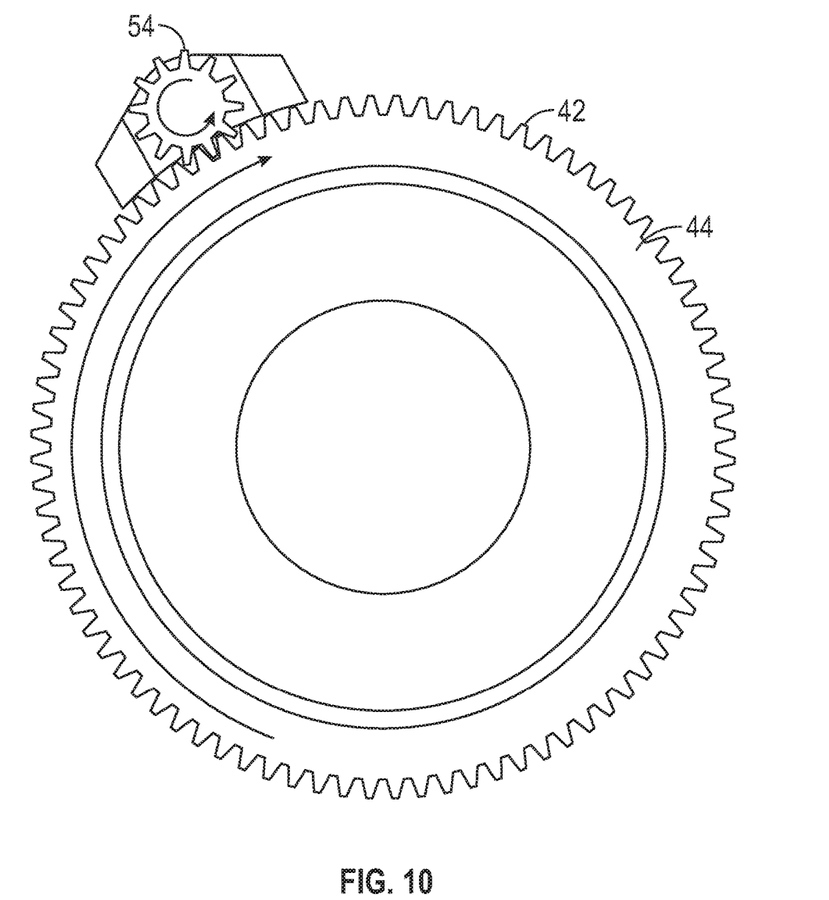
FIG. 10 is a schematic cross sectional end view of the pinion bracket assembly rotatably coupled with the collar nut to tighten to the liner housing.

FIG. 9A is a schematic perspective view of the collar nut securely coupled longitudinally with the cylinder liner and rotatably coupled with the pinion bracket assembly. FIG. 9B is a schematic cross sectional view of the collar nut securely coupled longitudinally with the cylinder liner and rotatably coupled with the pinion bracket assembly. FIG. 10 is a schematic cross sectional end view of the pinion bracket assembly rotatably coupled with the collar nut to tighten to the liner housing. The actuator 56 on the pinion 54 can be engaged to further rotate the collar nut 44 into a secure engagement with the liner housing 30, so that the end of the liner 12 is sufficiently engaged with the fluid end portion 16. The actuator 56 can be rotated using the gear ratio advantage between the teeth on the pinion 54 and the teeth 42 on the collar nut gear 42 to cause the collar nut threads 44 to be further coupled with the liner housing threads 32. The actuator 56 can be rotated manually or with a pneumatic/hydraulic power tool until the recommended torque is reached. At that point, the collar nut shoulder 48 should be sufficiently coupled with the liner shoulder 24 and the end of the liner 12 sufficiently coupled with the fluid end portion 16. In an exemplary and nonlimiting embodiment, the torque required at the pinion is about 600 to 700 foot-pounds to generate a typical recommended torque on the collar nut of about 4,000 to 5,000 foot-pounds. For different mechanical advantages, the relative gearing between the pinion and the collar nut gear can be varied. Some variations include the number of teeth, diameter of the pinion and/or collar nut gear, or number of gears, such as the pinion can be rotatably coupled with one or more intermediate gears that can be rotatably coupled with the collar nut gear.

Figure 11:
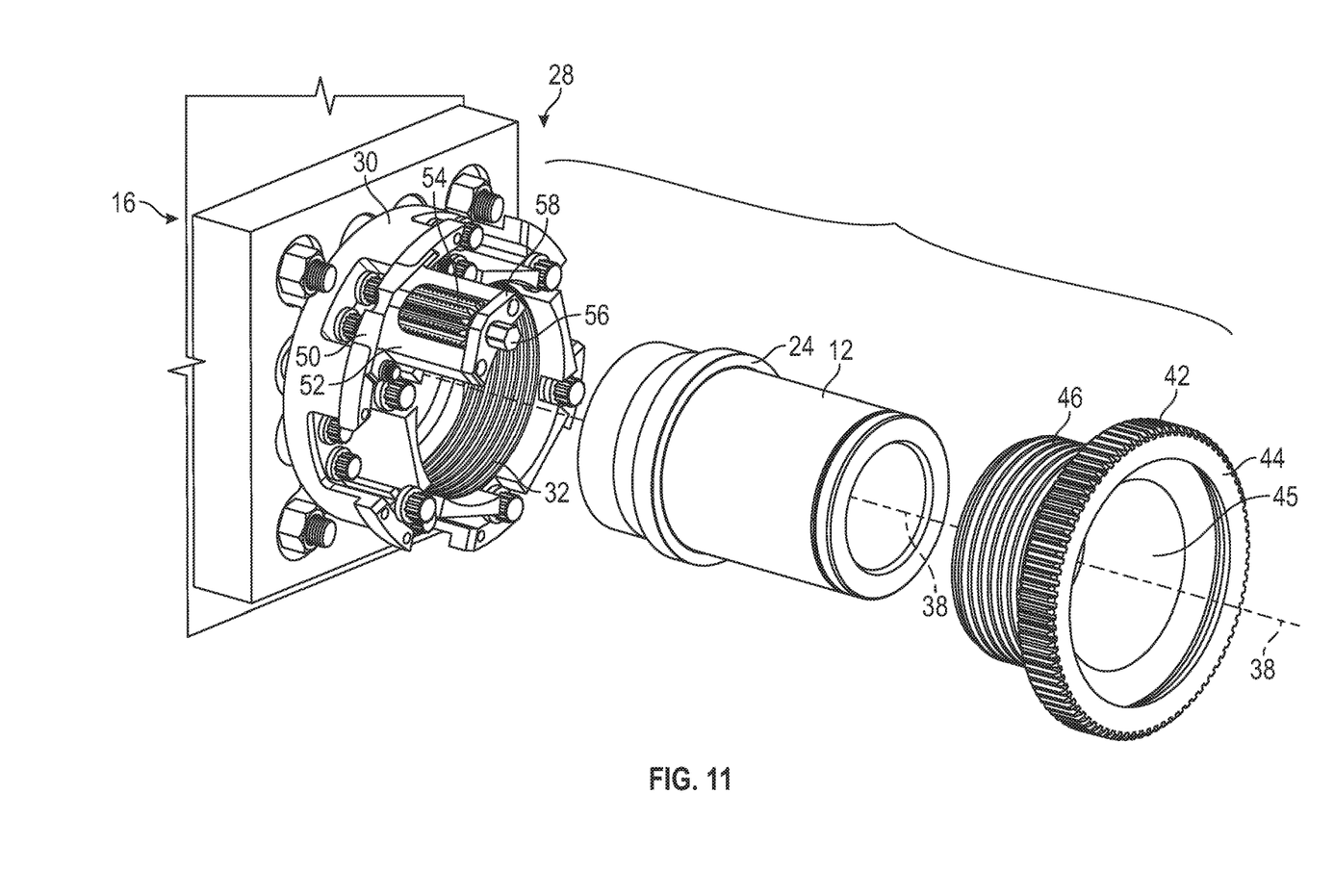
FIG. 11 is a schematic perspective assembly view of an alternative embodiment of a cylinder liner retainer system according to the present invention.

FIG. 11 is a schematic perspective assembly view of an alternative embodiment of a cylinder liner retainer system according to the present invention. In this embodiment, the threads 32 and 46 are reversed from external to internal and from internal to external, respectively. The cylinder liner retainer system 28 is coupled to the fluid end portion 16. The liner housing 30 includes an internal thread 32 that is configured to be coupled with an external thread 46 on the collar nut 44. The pinion bracket assembly 50 with the pinion housing 52 and the pinion support bracket 58, having the pinion 54 coupled therebetween, is sized to rotatably be coupled to the collar nut gear 42 on the collar nut 44. The liner 12 with the shoulder 24 is configured generally by sizing to be slidably coupled, such as by insertion, into the bore of the liner housing 30 and fit the bore 45 of the collar nut 44.

Figure 12A:
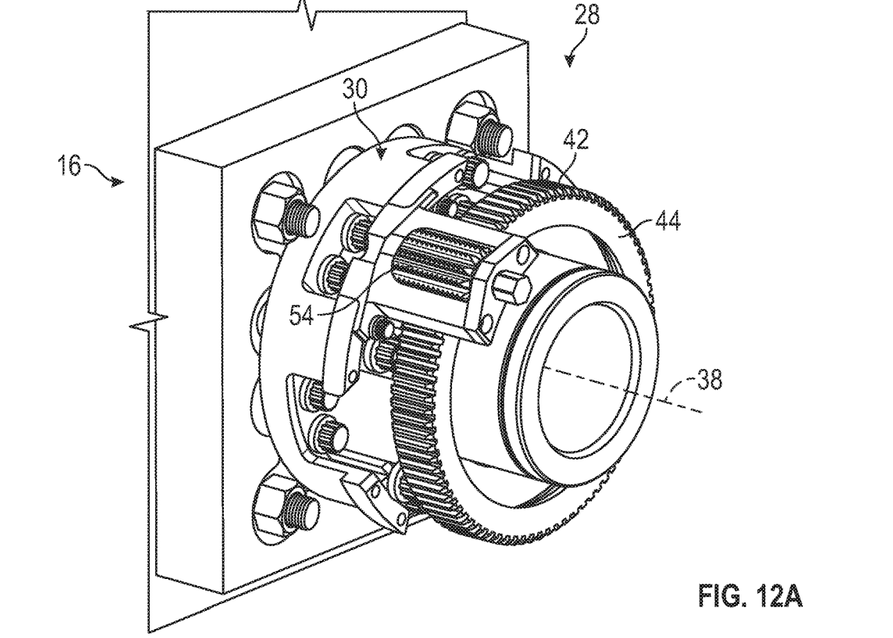
FIG. 12A is a schematic perspective view of the collar nut securely coupled longitudinally with the cylinder liner and rotatably coupled with the pinion bracket assembly.
Figure 12B:
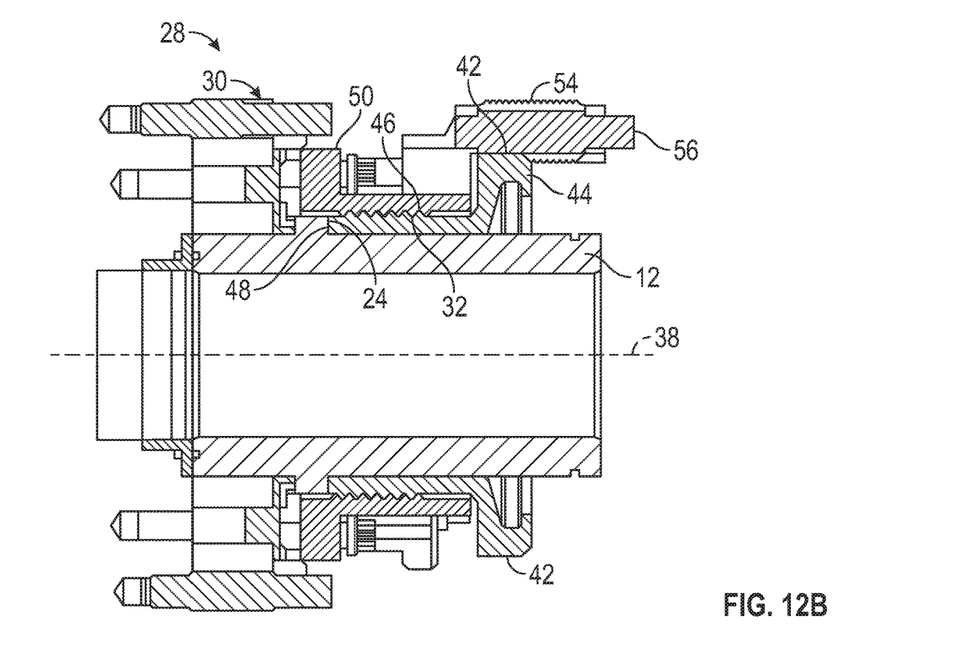
FIG. 12B is a schematic cross sectional view of the collar nut securely coupled longitudinally with the cylinder liner and rotatably coupled with the pinion bracket assembly.

FIG. 12A is a schematic perspective view of the collar nut securely coupled longitudinally with the cylinder liner and rotatably coupled with the pinion bracket assembly. FIG. 12B is a schematic cross sectional view of the collar nut securely coupled longitudinally with the cylinder liner and rotatably coupled with the pinion bracket assembly. The installation procedure is similar to the described above embodiment. The liner 12 can be slidably coupled into the liner housing bore 37 and the collar nut 44 can be slidably coupled over the distal end of the liner 12. The collar nut 44 can be rotated around the longitudinal axis 38 to couple the threads 32 of the liner housing 30 with the threads 46 of the collar nut 44. As the threads 32 and 46 are cooperatively coupled by rotation of the collar nut 44, the pinion 54 can turn when the teeth of the gear 42 are rotatably coupled with the corresponding teeth on the pinion 54 to become rotatably coupled. To securely tighten the liner 12 to the fluid end portion 16, the actuator 56 can be rotated to turn the teeth on the pinion 54 to rotate the teeth on the gear 42 on the collar nut 44. The shoulder 48 of the collar nut 44 can engage the shoulder 24 of the liner 12 and press the liner against the fluid end portion 16 securely coupled the liner 12.

The invention has been described in the context of preferred and other embodiments and not every embodiment of the invention has been described. Obvious modifications include variations in the number of components that may be combined or separated into subcomponents, the number, shape, and size of the pinion bracket assembly, threads, number of gears and teeth of the gears, the direction of the helical twist in the threads, number and size of gears, and other variations and associated methods of use and manufacture that an ordinary person skilled in the art would envision given the teachings herein. The disclosed and undisclosed embodiments are not intended to limit or restrict the scope or applicability of the invention conceived of by the Applicant, but rather, in conformity with the patent laws, Applicant intends to protect fully all such modifications and improvements that come within the scope or range of equivalents of the following claims.

What is claimed is:

1. A cylinder liner retainer system to couple a replaceable cylinder liner to a fluid end portion of a pump, the pump having a piston to reciprocate longitudinally along a centerline within the cylinder liner, comprising:
   a liner housing formed with threads and a longitudinal bore formed inside a housing wall and configured to be slidably coupled with the liner, the liner housing having a portion configured to be coupled to the fluid end portion;
   a pinion bracket assembly having a pinion rotatably coupled thereto, the pinion having gear teeth and a rotatable actuator; and
   a collar nut having a longitudinal bore sized to be slidably coupled with the liner on a distal end of the liner from the liner housing, the collar nut formed with threads configured to be rotatably coupled with the threads on the liner housing, and the collar nut having a gear with teeth configured to be rotatably coupled with the gear teeth on the pinion;
   wherein the collar nut is configured to be threadably coupled with the liner housing and secure the liner therebetween by rotation of the pinion that rotates the collar nut gear with the collar nut that couples the threads on the liner housing with the threads on the collar nut that presses the liner toward the fluid end portion.

2. The system of claim 1, wherein the liner housing threads comprise external threads and the collar nut threads comprise internal threads.

3. The system of claim 1, wherein the liner housing threads comprise internal threads and the collar nut threads comprise external threads.

4. The system of claim 1, wherein the collar nut comprises an internal radial shoulder configured to press against an external radial shoulder on the liner that presses the liner toward the fluid end portion as the collar nut is threadably coupled with the liner housing.

5. The assembly of claim 1, wherein the threads comprise helical threads.

6. The assembly of claim 1, wherein the pinion teeth are formed with circumferential grooves.

7. A method of installing a replaceable cylinder liner for a piston in a pump, the piston configured to reciprocate longitudinally along a centerline within the cylinder liner, the pump having a cylinder liner retainer system to couple the cylinder liner to a fluid end portion of the pump, the cylinder liner retainer system having a liner housing formed with threads and a longitudinal bore formed inside a housing wall, the liner housing having a portion configured to be coupled to the fluid end portion, a pinion bracket assembly having a pinion rotatably coupled thereto, the pinion having gear teeth and a rotatable actuator, and a collar nut having a longitudinal bore and formed with threads and having a collar nut gear with teeth, the method comprising:
   slidably coupling the cylinder liner into the bore of the liner housing;
   slidably coupling the collar nut with the cylinder liner, the collar nut bore being disposed over the cylinder liner at a distal end of the liner from the liner housing;
   rotating the collar nut to couple the threads on the collar nut with the threads on the liner housing;
   rotatably coupling the collar nut gear teeth with the pinion gear teeth; and
   rotating the actuator on the pinion to rotate the collar nut gear thereby
      further coupling the threads on the collar nut with the threads on the liner housing and
      pressing the liner toward the fluid end portion with the collar nut.

8. The system of claim 1, wherein the liner housing threads comprise external threads and the collar nut threads comprise internal threads.

9. The system of claim 1, wherein the liner housing threads comprise internal threads and the collar nut threads comprise external threads.

10. The system of claim 1, wherein the collar nut comprises an internal radial shoulder and the liner comprises an external radial shoulder and wherein pressing the liner toward the fluid end portion with the collar nut comprises pressing the liner radial shoulder with the collar nut radial shoulder toward the fluid end portion as the actuator is rotated.

* * * * *